US010458518B2

(12) United States Patent
Chhuor

(10) Patent No.: US 10,458,518 B2
(45) Date of Patent: Oct. 29, 2019

(54) PLANETARY GEAR ASSEMBLY

(71) Applicant: Goodrich Actuation Systems SAS, Buc (FR)

(72) Inventor: Bertrand Chhuor, Paris (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 272 days.

(21) Appl. No.: 15/399,959

(22) Filed: Jan. 6, 2017

(65) Prior Publication Data
US 2017/0198786 A1  Jul. 13, 2017

(30) Foreign Application Priority Data

Jan. 12, 2016 (EP) ..................... 16305023

(51) Int. Cl.
*F16H 1/46* (2006.01)
*B64C 13/34* (2006.01)

(52) U.S. Cl.
CPC ............... *F16H 1/46* (2013.01); *B64C 13/34* (2013.01)

(58) Field of Classification Search
CPC combination set(s) only.
See application file for complete search history.

(56) References Cited

U.S. PATENT DOCUMENTS 2,944,444 A  7/1960 Burns
3,008,355 A  11/1961 Grudin
2016/0281823 A1* 9/2016 Ogauchi .................. F16H 3/66

FOREIGN PATENT DOCUMENTS

DE  1167143 B  4/1964
DE  102013101864 A1  8/2014

OTHER PUBLICATIONS

European Search Report for Application No. 16305023.0-1752, dated Jun. 29, 2016, 6 Pages.

* cited by examiner

*Primary Examiner* — Derek D Knight
(74) *Attorney, Agent, or Firm* — Cantor Colburn LLP

(57) ABSTRACT

A planetary gear assembly is provided, comprising a first planetary gear stage and a second planetary gear stage. The first planetary gear stage comprises a first sun gear, first planet gears and an outer ring gear, and the second planetary gear stage comprises a second sun gear, second planet gears and one or more output ring gears. The outer ring gear and the second sun gear are the same component, and the first planetary gear stage is located within the second planetary gear stage.

10 Claims, 3 Drawing Sheets

PLANETARY GEAR ASSEMBLY

FOREIGN PRIORITY

This application claims priority to European Patent Application No. 16305023 filed Jan. 12, 2016, the entire contents of which is incorporated herein by reference.

TECHNICAL FIELD

The present invention relates generally to a planetary gear assembly and associated methods.

BACKGROUND

Planetary or epicyclic gears are known in the art and are generally designed to transfer drive from an input shaft to an output, for example an output shaft or a load connected to the output. In such systems, a number of planet gears are meshed between an outer, or ring gear and a central, or sun gear. The planet gears may be rotationally fixed and able to rotate about their respective axes. If the sun gear is connected to an input shaft, and the ring gear is connected to an output load, then rotation of the input shaft will cause actuation of the output load.

Compound planetary gears are known wherein the input shaft is coupled to multiple output loads. This may be achieved by providing two ring gears and meshing these to the planet gears separately. For example, a first ring gear may be meshed with the planet gears at respective axial ends of the ring gears, and a second ring gear may be meshed with the planet gears at a central axial location.

It is possible to drive the first and second ring gears, and their respective output loads, at different rates by providing different meshing arrangements between the planet gears and the first and second ring gears. For example, the meshing between the planet gears and the first ring gear may have a different amount of teeth than the meshing between the planet gears and the second ring gear.

Most planetary gear systems are used in an environment having restricted space, for example in an aircraft. As such, it is desirable to provide a planetary gear system that is light and compact.

SUMMARY

According to an aspect of the invention there is provided a planetary gear assembly comprising: a first planetary gear stage comprising a first sun gear, a plurality of first planet gears and a first stage output ring gear; a second planetary gear stage comprising a second sun gear, a plurality of second planet gears and one or more second stage output ring gears; wherein the first stage output ring gear and the second sun gear are the same component, and the first planetary gear stage is located within the second planetary gear stage.

Locating the second stage within the first stage as described herein means that a compound planetary gear assembly can be reduced in size, as compared to conventional side-by-side arrangements. This provides a lighter and more compact assembly.

The first planetary gear stage may have a first axial length and the second planetary gear stage may have a second axial length, and the first axial length may be shorter than the second axial length.

The first planetary gear stage may be located radially and/or axially and/or concentrically within the second planetary gear stage.

The first sun gear, the second sun gear and the one or more output ring gears may be rotatable around a common central axis.

The second planetary gear stage may have an axial plane of symmetry, and the first planetary gear stage may be located at the axial plane of symmetry.

The first planet gears and the second planet gears may share a common axial plane of symmetry.

The second planet gears may be rotatable about their respective central axes. The second planet gears may be arranged and adapted to collectively rotate about a common central axis upon rotation of the second planet gears about their respective central axes.

The rate of rotation of the one output ring gear may be influenced and/or affected by the rate of rotation of the second planet gears about their respective axes as well as the rate of rotation of the second planet gears about a or the common central axis of rotation.

A volume may be defined radially within the second planetary gear stage, and the first planetary gear stage is located within the volume. One or more sensors, bearings or other aircraft components may additionally be located within the volume defined radially within the second planetary gear stage.

The first planetary gear stage may comprise one or more first, fixed (i.e. non-rotating) ring gears or ring portions. The first fixed ring gears may form part of the housing of the planetary gear assembly. The plurality of first planet gears may comprise primary teeth that mesh with the first stage output ring gear. The plurality of first planet gears may comprise secondary teeth that mesh with teeth located on the one or more first fixed ring gears. In this manner, the plurality of first planet gears may be configured to rotate about their respective central axes of rotation as well as the common central axis of the planetary gear assembly.

The second planetary gear stage may comprise one or more second, fixed (i.e. non-rotating) ring gears or ring portions. The second fixed ring gears may form part of the housing of the planetary gear assembly. The plurality of second planet gears may comprise primary teeth that mesh with the second stage output ring gear. The plurality of second planet gears may comprise secondary teeth that mesh with teeth located on the one or more second fixed ring gears. In this manner, the plurality of second planet gears may be configured to rotate about their respective central axes of rotation as well as the common central axis of the planetary gear assembly.

According to an aspect of the invention, there is provided a method of using a planetary gear assembly as claimed in any preceding claim. The method may comprise rotating or driving the first sun gear so as to cause rotation of the one output ring gear.

According to an aspect of the invention, there is provided an aircraft gearbox comprising a planetary gear assembly as described hereinabove.

The one or more output ring gears may be connected to one or more output loads, and the one or more output loads may comprise one or more aircraft components, for example wing flaps or ailerons.

According to an aspect of the invention, there is provided a method of using an aircraft gearbox as described hereinabove, the method comprising rotating or driving the first sun gear so as to actuate the one or more output loads.

BRIEF DESCRIPTION OF THE DRAWINGS

Various embodiments will now be described, by way of example only, and with reference to the accompanying drawings in which.

DETAILED DESCRIPTION

Figure 1:
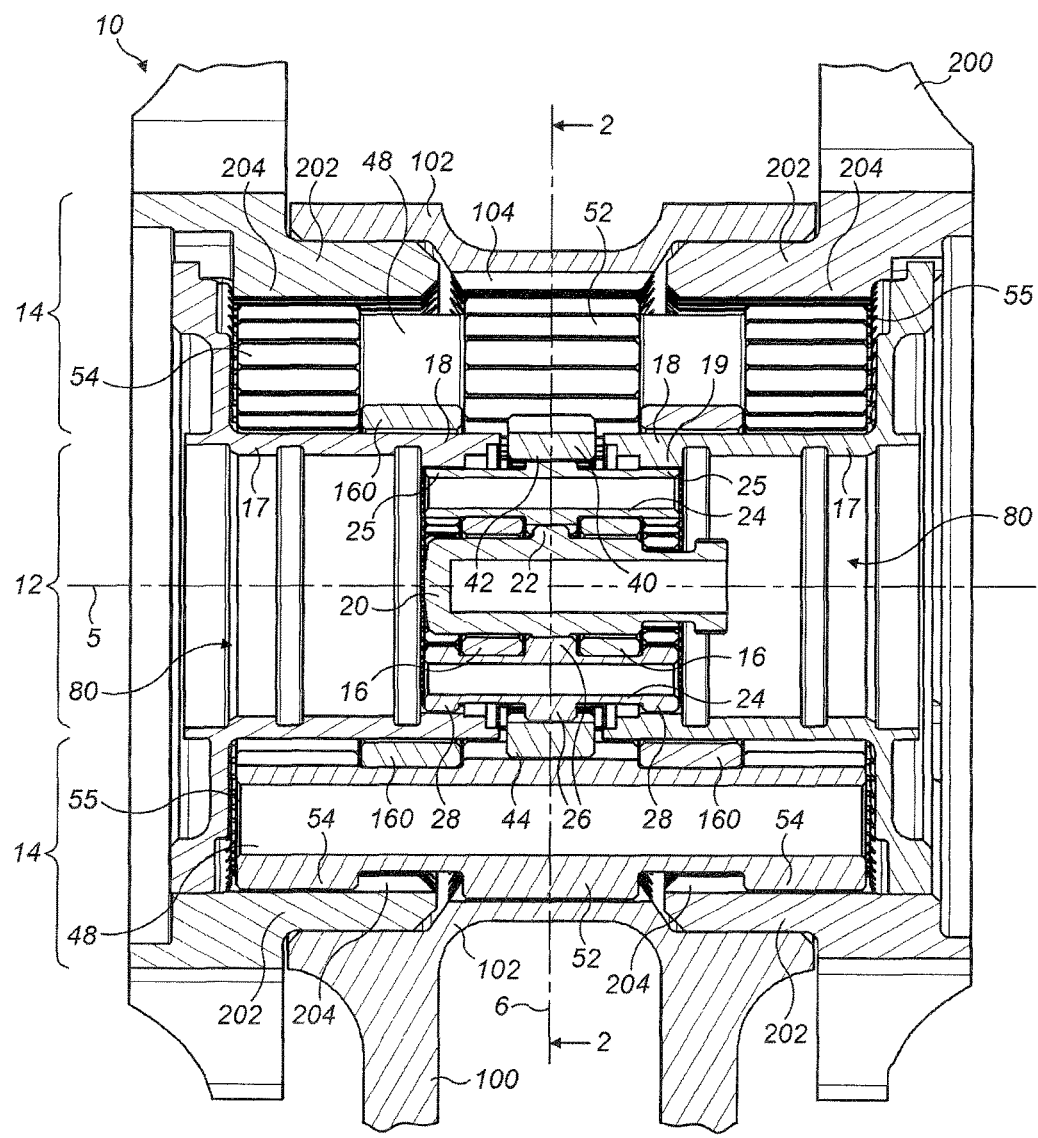
FIG. 1 shows a compound planetary gear system.
Figure 2:
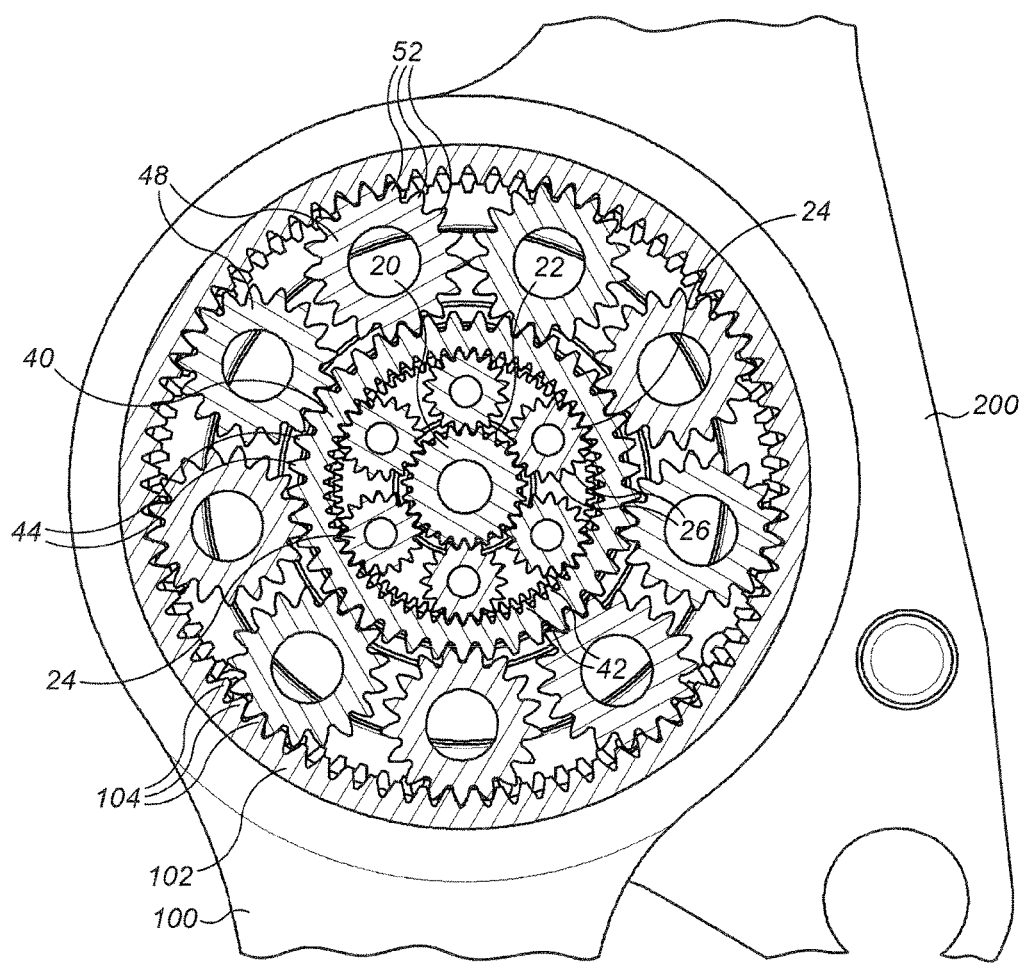
FIG. 2 shows a cross-section through line 2-2 in FIG. 1.

FIGS. 1 and 2 show an embodiment of the present disclosure.

A planetary gear assembly or gearbox 10 is shown that is configured to simultaneously drive or actuate an output load 100. The planetary gear assembly 10 may be part of an actuator for use in an aircraft, for example a spoiler and/or flap actuator. The output load 100 may be connected to a wing flap or wing spar, for example.

The planetary gear assembly 10 comprises a first, or speed stage 12 and a second, or power stage 14. In accordance with the disclosure, the first stage 12 is located concentrically within the second stage 14. In the illustrated embodiment, each stage 12, 14 comprises a sun gear, a plurality of planet gears, two stationary ring gears and a single output (rotating) ring gear, as described below. In other embodiments, any number of ring gears (including stationary and rotating) may be provided as appropriate.

The first stage 12 comprises a first or central sun gear 20 that acts as the input shaft to the planetary gear assembly 10. The central sun gear 20 may be connected to any type of drive input, such as a motor. The central sun gear 20 has a plurality of teeth 22 aligned with a plane of symmetry 6 of the planetary gear assembly 10. The plane of symmetry 6 is a plane that is perpendicular to an axial centreline 5 of the planetary gear assembly 10 and located at the mid-point of the axial centreline 5. The axial centreline 5 also forms a central axis of rotation 5 of the planetary gear assembly, about which the various sun and ring gears rotate as described below.

Encircling the central sun gear 20 are a plurality of first planet gears 24 that are configured to rotate about their respective central axes and also around the central axis of rotation 5. The first planet gears 24 are held in place by first journal rings 16. For simplicity, the supporting structures and other bearings of the planetary gear assembly 10 are not shown in FIG. 1. In the illustrated embodiment, six first planet gears 24 are shown but any amount can be provided as desired.

The first planet gears 24 are each coupled to a first stage (output) ring gear 40, which encircles the first planet gears 24 and has the same axis of rotation 5 as the central sun gear 20. The first stage ring gear 40 has primary teeth 42 that are located around its radially inner surface, and outer teeth 44 that are located around its radially outer surface.

A first housing 17 comprises two ring portions or gears 19 that are located concentrically around the central axis of rotation 5 and at the respective axial ends of the first planet gears 24. The first housing 17 is fixed and does not form a moving part of the planetary gear assembly 10, i.e. it does not rotate about the central axis of rotation 5.

The first planet gears 24 each comprise central teeth 26 that are located at the plane of symmetry 6 of the planetary gear assembly 10. In addition to the primary teeth 26, the first planet gears 24 further comprise two sets of secondary teeth 28 that are located at respective axial ends 25 of the first planet gears 24.

The ring portions 18 of the first housing 17 each comprise teeth 19 that mesh with the secondary teeth 28 of the first planet gears 24. The teeth 22 of the central sun gear 20 mesh with the primary teeth 26 of the first planet gears 24. In this manner, rotation of the central sun gear 20 causes rotation of the planet gears 24 about their respective axes and the central axis of rotation 5.

The central teeth 26 of the first planet gears 24 mesh with the primary teeth 42 of the first stage ring gear 40. In this manner, rotation of the planet gears 24 about their respective axes and the central axis of rotation 5 cause the rotation of first stage ring gear 40 about the central axis of rotation 5.

As will be appreciated, rotation of the central sun gear 20 causes the first stage ring gear 40 to rotate, but at a slower rate than the central sun gear 20. In this manner, the central sun gear 20, first planet gears 24, first housing 17 and first stage ring gear 40 combine to form the first stage 12 of the planetary gear assembly 10.

The planetary gear assembly 10 of the present disclosure is a two-stage compound planetary or epicyclic gear assembly and the further features that are provided to achieve this are described below.

The first stage ring gear 40 forms the sun gear for the power stage 14, and may be referred to as a second sun gear 40. Encircling the first or power stage ring gear 40 are a plurality of second planet gears 48. The second planet gears 48 comprise primary teeth 52 located at the plane of symmetry 6 of the planetary gear assembly 10. In the illustrated embodiment, nine second planet gears 48 are shown, but any amount may be provided as desired.

In a similar manner to the first planet gears 24, the second planet gears 48 are configured to rotate about their respective central axes and also around the central axis of rotation 5 and are held in place by second journal rings 160. Again, the supporting structures and other bearings of the planetary gear assembly 10 are not shown in FIG. 1. The outer teeth 44 of the power stage ring gear 40 mesh with the primary teeth 52 of the second planet gears 48 so as to rotate the second planet gears 48 about their respective central axes.

A second housing 200 comprises two ring portions or gears 202 that are located concentrically around the central axis of rotation 5 and at the respective axial ends of the second planet gears 48. The second housing 200 is fixed and does not form a moving part of the planetary gear assembly 10, i.e. it does not rotate about the central axis of rotation 5.

In addition to the primary teeth 52, the second planet gears 48 further comprise secondary teeth 54 located at respective axial ends 55 thereof. The ring portions 202 of the second housing 200 each comprise teeth 204 that mesh with the secondary teeth 54 of the second planet gears 48. As such, rotation of the power stage ring gear 40 causes rotation of the second planet gears 48 about their respective axes and the central axis of rotation 5.

The output load 100 comprises a ring portion forming the second stage (output) ring gear 102 that is located concentrically around the second planet gears 48. The second stage ring gear 102 comprises teeth 104 that mesh with the primary teeth 52 of the second planet gears 48. As such, rotation of the second planet gears 48 about their respective axes and the central axis of rotation 5 cause rotation of the ring portion 102, and output load 100 about the central axis of rotation 5.

It will be appreciated that the rate of rotation of the second stage ring gear 102 (and therefore the output load 100) will be affected by the rate of rotation of the second planet gears 48 about their respective axes, as well as the rate of rotation of the second planet gears 48 about the central axis of rotation 5.

Rotation of power stage ring gear 40 causes the second stage ring gear 102 and the output load 100 to rotate, but at a slower rate than the first stage ring gear 40. In this manner, the first stage ring gear (or second sun gear) 40, second planet gears 48, ring portions 202 of second housing 200 and ring portion 102 combine to form the second stage 14 of the planetary gear assembly 10.

The various rates of rotation described herein are affected, inter alia, by the amount of teeth that are provided on the various parts of the apparatus, the radial locations of the teeth, the relative sizes of the various parts, etc. It will be appreciated, therefore, that the planetary gear assembly of the present disclosure is highly tunable and can provide various actuation or rotation rates of the output load 100.

In accordance with the disclosure, the first or speed stage 12 is located concentrically within the second or power stage 14, and the first stage ring gear 40 forms the sun gear for the second stage 14. In conventional compound gear arrangements, the first stage 12 is typically located side-by-side with the second stage 14, which increases the axial length of the gearbox. The planetary gear assembly 10 described herein achieves a large size reduction to the gearbox whilst retaining the high reduction ratio that is typically exhibited by conventional, side-by-side compound planetary gear arrangements. The width of the planetary gear assembly 10 as described herein may be dictated only by the width of the second, or power stage 14.

The planetary gear assembly 10 of the present disclosure is designed to allow a small speed stage to fit within a larger power stage. As can be seen from FIG. 1, this arrangement results in volumes 80 that are located on either side of the speed stage 12. It is possible to use these volumes 80 to house or contain other components. Embodiments are envisaged wherein supplementary components are located within the volumes 80. Supplementary components may be, for example, electronic or other equipment such as sensors. Other supplementary components may include bearings or housing for the planetary gear assembly 10.

Figure 3:
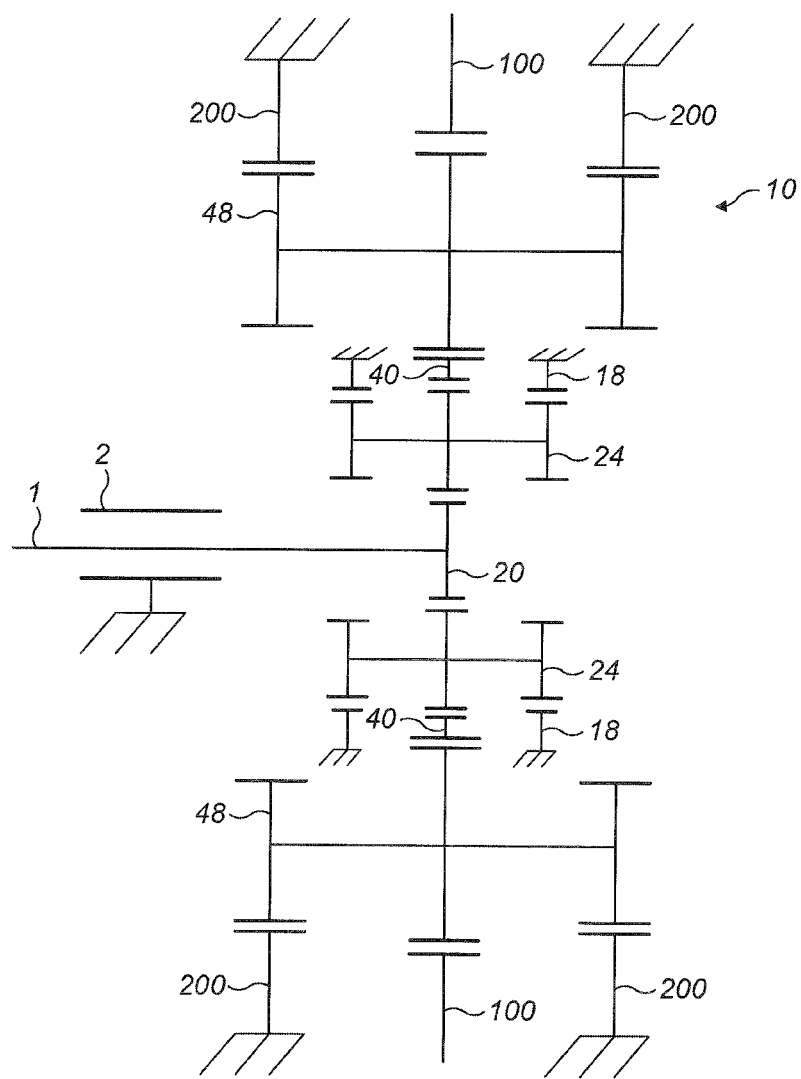
FIG. 3 shows schematically the connections in the compound planetary gear system of FIGS. 1 and 2.

FIG. 3 is a schematic diagram showing the connection points and drive/loads of the planetary gear assembly 10.

The central sun gear 20 may be driven by a drive shaft 1 and motor 2. The central sun gear 20 meshes to the plurality of first planet gears 24 via teeth 22 of sun gear 20 and central teeth 26 of first planet gears 24 (see e.g., FIGS. 1 and 2). The first planet gears 24 mesh to first housing 17 via secondary teeth 28 of the first planet gears 24 and teeth 19 located on first housing 17. As such, rotation of central sun gear 20 causes rotation of the first planet gears 24 about their respective central axes and the central axis of rotation 5.

The first planet gears 24 mesh to the power or first stage ring gear 40 via central teeth 26 of first planet gears 24 and primary teeth 42 of the first stage ring gear 40 such that rotation of the first planet gears 24 about their respective central axes and the central axis of rotation 5 causes the power stage ring gear 40 to rotate about the central axis of rotation 5.

It will be appreciated that the rate of rotation or actuation of the power stage ring gear 40 is affected by the rate of rotation of the first planet gears 24 about their respective central axes, as well as their collective rate of rotation about the central axis of rotation 5.

The power stage ring gear 40 meshes to the plurality of second planet gears 48 via outer teeth 44 of power stage ring gear 40 and primary teeth 52 of the second planet gears 48.

The second planet gears 48 mesh to the second housing 200 via secondary teeth 54 of the second planet gears 48 and teeth 204 located on second housing 200. As such, rotation of power stage ring gear 40 causes rotations of second planet gears 48 about their respective central axes and the central axis of rotation 5.

The second planet gears 48 mesh to the output load 100 via primary teeth 52 of the second planet gears 48 and teeth 104 located on output load 100 such that rotation of second planet gears 48 about their respective central axes and the central axis of rotation 5 cause the output load 100 to rotate about the central axis of rotation 5.

It will be appreciated that the rate of rotation or actuation of the output load 100 is affected by the rate of rotation of the second planet gears 48 about their respective central axes, as well as their collective rate of rotation about the central axis of rotation 5.

Although the present invention has been described with reference to various embodiments, it will be understood by those skilled in the art that various changes in form and detail may be made without departing from the scope of the invention as set forth in the accompanying claims.

The invention claimed is:

1. An actuator for use in an aircraft and comprising a planetary gear assembly, the planetary gear assembly comprising:
   a first planetary gear stage comprising a first sun gear, a plurality of first planet gears and a first stage output ring gear; and
   a second planetary gear stage comprising a second sun gear, a plurality of second planet gears and one or more second stage output ring gears;
   wherein said first stage output ring gear and said second sun gear are the same component, and said first planetary gear stage is located within said second planetary gear stage;
   wherein said first planetary gear stage has a first axial length and said second planetary gear stage has a second axial length, and said first axial length is shorter than said second axial length;
   wherein said first planetary gear stage is located radially and axially within said second planetary gear stage;
   wherein a volume is defined radially within said second planetary gear stage, and said first planetary gear stage is located within said volume; and
   wherein one or more sensors or other electronic equipment are located within said volume.

2. The actuator as claimed in claim 1, wherein said first sun gear, said second sun gear and said one or more output ring gears are rotatable around a common central axis.

3. The actuator as claimed in claim 1, wherein said second planetary gear stage has an axial plane of symmetry, and said first planetary gear stage is located at said axial plane of symmetry.

4. The actuator as claimed in claim 1, wherein said first planet gears and said second planet gears share a common axial plane of symmetry.

5. The actuator assembly as claimed in claim 1, wherein said second planet gears are rotatable about their respective central axes.

6. The actuator as claimed in claim 5, wherein said second planet gears are arranged and adapted to collectively rotate about a common central axis upon rotation of said second planet gears about their respective central axes.

7. The actuator as claimed in claim 5, wherein the rate of rotation of the one or more second stage output ring gears is affected by the rate of rotation of the second planet gears about their respective axes as well as the rate of rotation of the second planet gears about a or the common central axis of rotation.

8. A method of using the actuator as claimed in claim 1, comprising rotating or driving said first sun gear so as to cause rotation of said one or more second stage output ring gears.

9. An aircraft gearbox comprising the actuator as claimed in claim 1.

10. An aircraft gearbox as claimed in claim 9, wherein said one or more second stage output ring gears are connected to one or more output loads, and said one or more output loads comprise one or more aircraft components, for example wing flaps or ailerons.

\* \* \* \* \*